Dec. 26, 1961 M. J. DAVIES 3,014,707
CUTTER LOADERS HAVING REVERSIBLE CUTTER DRUMS
Filed July 25, 1957
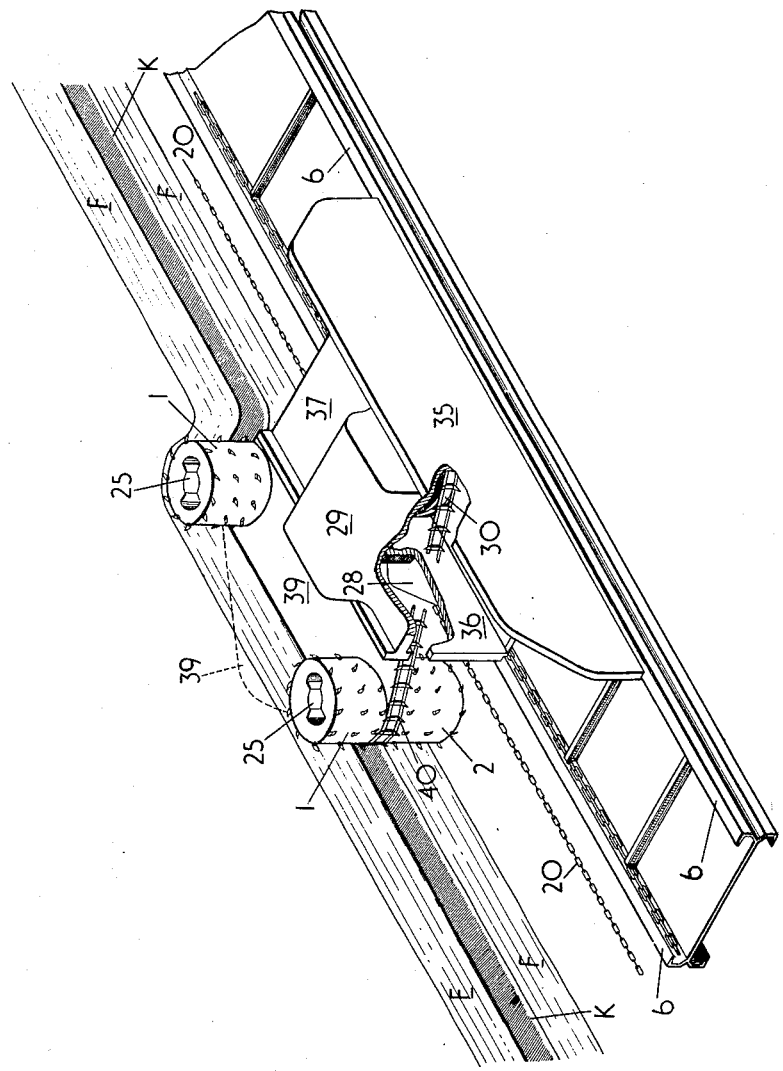

United States Patent Office 3,014,707
Patented Dec. 26, 1961

3,014,707
CUTTER LOADERS HAVING REVERSIBLE CUTTER DRUMS
Maynard John Davies, Porth, South Wales, assignor to Coal Industry (Patents) Limited, London, England, a British company
Filed July 25, 1957, Ser. No. 674,058
Claims priority, application Great Britain Aug. 2, 1956
1 Claim. (Cl. 262—27)

This invention relates to a longwall cutter-loader machine for winning coal or other minerals in mines. Such machines cut coal or other minerals from a face and load the cut material on to a conveyor, for example, a face conveyor. The term "coal" as used hereinafter is to be understood as including other minerals.

An object of the invention is to provide a machine which is simple and of robust construction, and is efficient in operation.

Apparatus embodying features of the invention is illustrated by way of example in the accompanying drawing.

Referring to said drawing, the cutting and loading machine has a supporting frame comprising two side members 35 and 36 which rest on a scraper chain conveyor structure 6. The side members 35 and 36 are connected together by a top member 37. Secured to the supporting frame is a horizontal pre-cutting jib 39 which is of somewhat triangular form in plan view and is provided with a cutting chain 40 provided with cutter picks.

Four loading and cutting drums 1 and 2 are mounted symmetrically on the pre-cutting jib 39 and rotate about vertical axes.

The machine is shown operating upon a coal face F in which the pre-cutting jib 39 cuts a kerf K.

The cutting chain 40 is driven by means of a hydraulic or electric motor arranged within a drive unit 29, through a sprocket 30, and the cutting chain 40 drives the drums 1 and 2. A haulage chain sprocket and mechanism are arranged within a housing 28 to operate through the haulage chain 20, power being supplied from a haulage motor or from the motor which drives the cutting chain 40.

In the top of each drum 1 can be seen a dog-tooth recess 25 to receive a complementary projection on another drum which may be placed on top of the drum 1 to suit the thickness of the seam to be cut.

As the machine moves from left to right as viewed in the drawing, the drums at both the leading and trailing ends rotate in the clockwise direction. The front drums cut the coal from floor to roof level relatively deeply into the mineral web and throw most of the cut material on to the conveyor 6; any coal which is left behind is thrown towards the conveyor by the lower of the rear drums. When the direction of motion of the machine is reversed, the direction of rotation of the drums is also reversed and the action of the machine is the same.

I claim:

A longwall cutter-loader mining machine comprising in combination a supporting frame adapted to rest on and slide along the side members of a mine face conveyor, supporting means extending laterally and substantially horizontally from the said supporting frame, two pairs of cutter drums mounted symmetrically on said supporting means, each of said cutter drums rotating about a vertical axis and one drum of each pair cutting below said supporting means down to floor level beside said conveyor and the other drum of each pair being arranged above said supporting means and cutting up to roof level, each pair of said cutter drums being operative to cut relatively deeply into the mineral web, and all of said cutter drums being reversible in their directions of rotation and being driven so that in either direction of travel of the machine the leading pair of said cutter drums cuts mineral from the mine face and throws it towards said face conveyor and mineral which falls to the floor is caught up and thrown towards said face conveyor by the lower of said cutter drums in the trailing pair of said cutter drums.

References Cited in the file of this patent

UNITED STATES PATENTS

| | | |
|---|---|---|
| 1,500,352 | Walker | July 8, 1924 |
| 2,394,194 | McCarthy | Feb. 5, 1946 |
| 2,592,358 | Tutwiler | Apr. 8, 1952 |
| 2,598,948 | Trenczak | June 3, 1952 |
| 2,730,346 | Joy | Jan. 10, 1956 |

FOREIGN PATENTS

| | | |
|---|---|---|
| 592,754 | Germany | Feb. 14, 1934 |
| 709,538 | Great Britain | May 26, 1954 |
| 730,659 | Great Britain | May 25, 1955 |
| 877,735 | Germany | May 26, 1953 |
| 890,336 | Germany | Sept. 28, 1953 |